United States Patent [19]
Basard et al.

[11] 3,810,178
[45] May 7, 1974

[54] RANGE-CONTROLLED VARIABLE GAIN DEVICE FOR PULSE RADAR RECEIVER

[75] Inventors: Robert Basard, Meudon; Michel R. J. Dalbera, Chatillon sur Bagneux, both of France

[73] Assignee: International Standard Electric Corporation, New York, N.Y.

[22] Filed: Nov. 29, 1972

[21] Appl. No.: 310,244

[30] Foreign Application Priority Data
Nov. 29, 1971 France .................. 71.42640

[52] U.S. Cl. .................. 343/16 M, 343/5 SM
[51] Int. Cl. .................. G01s 9/22, G01s 7/34
[58] Field of Search .................. 343/5 SM, 16 M

[56] References Cited
UNITED STATES PATENTS

| 3,725,913 | 4/1973 | Roehl et al. .................. 343/5 SM |
| 3,728,723 | 4/1973 | Gellekink .................. 343/16 M X |
| 3,735,404 | 5/1973 | Schwartz .................. 343/16 M X |
| 3,765,020 | 10/1973 | Seager et al. .................. 343/5 SM |
| 3,659,290 | 4/1972 | Bourque .................. 343/5 SM |
| 3,599,208 | 8/1971 | Nelson .................. 343/16 M X |

*Primary Examiner*—T. H. Tubbesing
*Attorney, Agent, or Firm*—William T. O'Neil

[57] ABSTRACT

A coherent monopulse radar receiving system with discrete-step sensitivity-time control. The video signals of each channel (sum and difference) are fed to separate ladder attenuators each having n sections or stages. The n outputs of those attenuators provide the inputs to the range selectors of the system which are also separate for sum and difference channels. The result is a step-like attenuation curve approximating the theoretical curve ($1/t^4$). A variation shown involves grouping of range selectors to obtain broader approximation. In either embodiment the equality of sum and difference channel gains is maintained to a high degree of accuracy.

7 Claims, 5 Drawing Figures

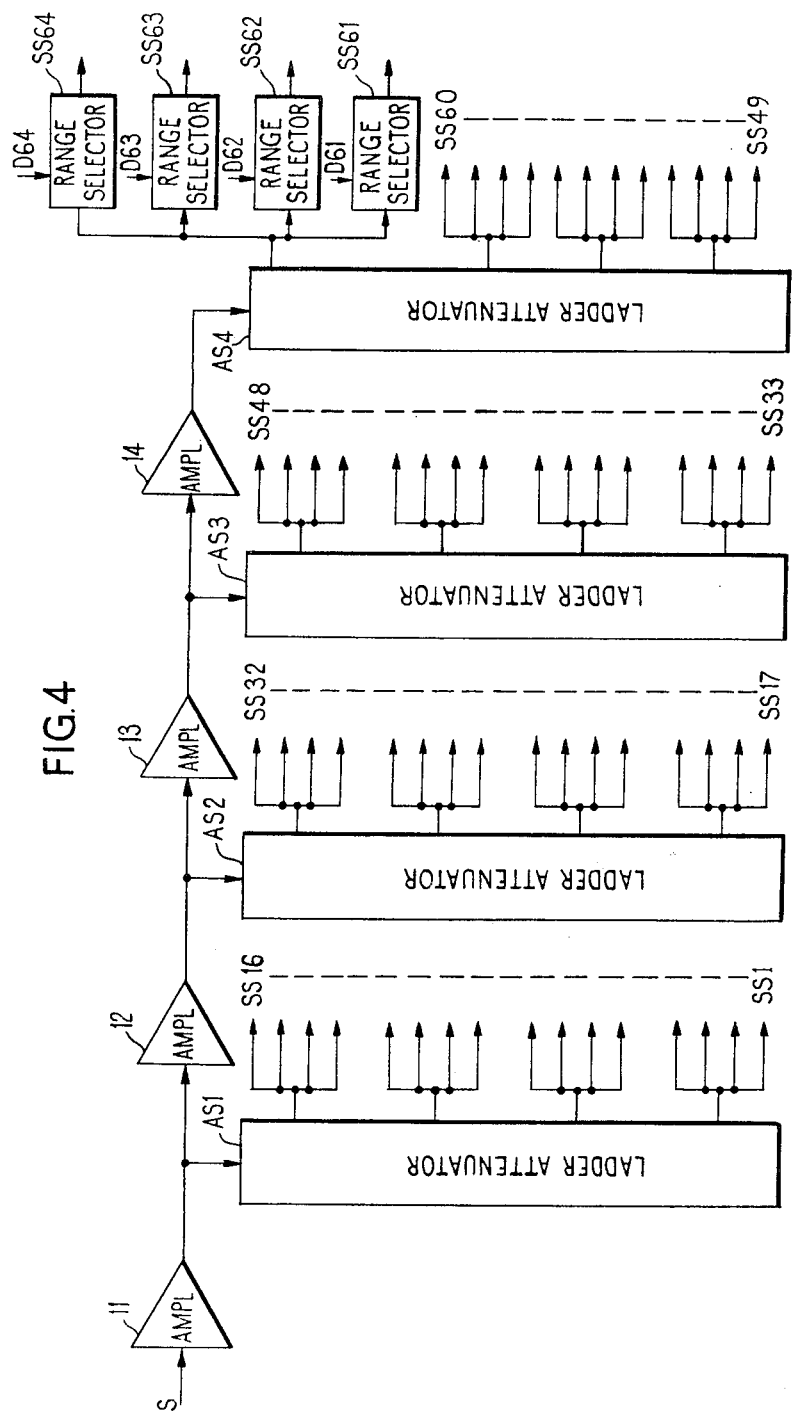

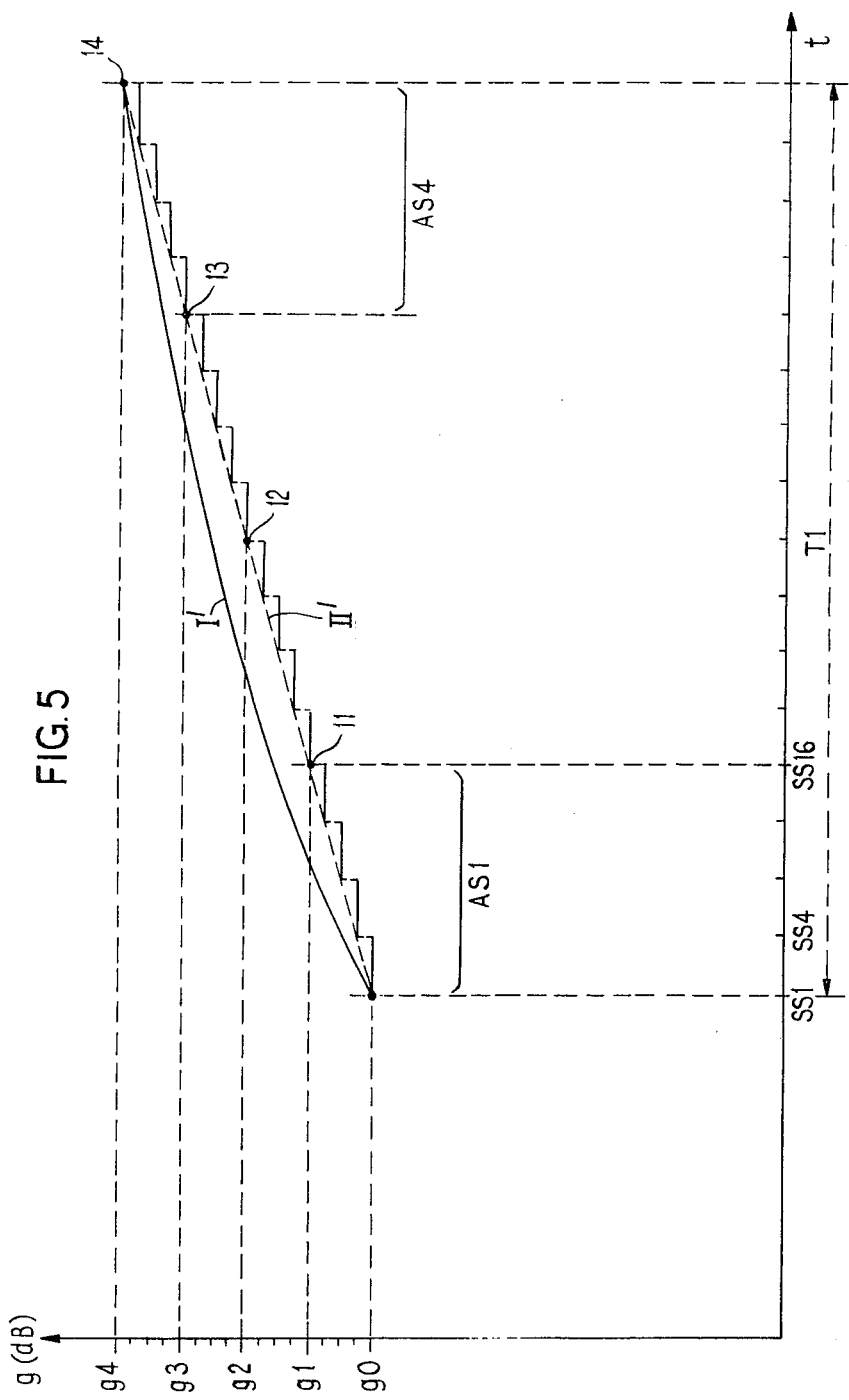

RANGE-CONTROLLED VARIABLE GAIN DEVICE FOR PULSE RADAR RECEIVER

CROSS REFERENCE TO RELATED APPLICATION

This application is filed under the provisions of 35 U.S.C. 119 with claim for the benefit of the filing of an application covering the same invention filed Nov. 29, 1971, Ser. No. 71–42640 in France.

BACKGROUND OF THE INVENTION

1. Field of the Invention

The present invention relates to a pulse radar receiver device for providing a gain variable as a function of range (Sensitivity-time control).

The device according to the invention is particularly applicable to systems for processing signals of a monopulse radar.

2. Description of the Prior Art

In the prior art, various forms of sensitivity time control (STC) are known. Their use follows from the fact the dynamic range of signals at the input of a radar receiver is very great. This is due to detected target cross-section variation over a ratio of $10^4$ (i.e. 40 dB) as a function of range as well as target size, and also because received waves are subject to attenuation during propagation, such attenuation being proportional to $1/d^4$), where d represents the distance from the radar to a target. By way of example, for a radar detecting targets located within a range increment on the order of 1 to 5 kilometers, signal amplitude variation due to propagation attenuation is as much as 28 dB.

It is necessary to compensate by reducing the signal dynamic range so as to render it compatible with capabilities of signal processing circuits, in particular in the case of monopulse radar processing circuits (extractors, quotient computers, etc...).

Thus it has long been known to use some device having or imposing a gain which is variable as a function of range. Such a device is generally associated with an intermediate frequency (IF) amplifier to vary its gain with time so as to approximately compensate the attenuation law ($1/t^4$). This gain variation law is repeated for each radar repetition period. Such a device is particularly useful for a coherent pulse radar because it makes it possible to maximize gain at long ranges (corresponding to longer time delays between transmitted and received pulses without producing circuit saturation from close returns).

In the case of a monopulse coherent radar, signals returned by a target are received by an antenna including, at least, two primary sources whose reception patterns are partially overlapping and are substantially symmetrical with respect to the antenna axis. Signals received by those two sources are, on the one hand, added to form a sum signal processed in a sum receiver channel and, on the other hand, subtracted to form a difference signal processed in a difference channel. Information concerning the angular deviation of target with respect to antenna axis is normally developed by calculating the ratio of difference and sum signal amplitudes. Any differential gain variation in sum and difference channels therefore results in an error affecting that ratio and, accordingly, an error affecting the target angular position computation is introduced. Any STC used for imposing a gain variable as a function of distance, must affect the sum and difference channels in a same manner. For example, in the case of the ground surveillance radar described in the U.S. Pat. application, Ser. No. 178,665 filed on Sept. 8, 1971 and entitled "Surveillance Doppler Radars" now U.S. Pat. No. 3,717,874, the desired accuracy on angular deviation measurements is on the order of ±1 percent, however, prior art variable gain devices applying IF amplifier control exhibit differential gain variation on the order of 10 percent between sum and difference channels.

SUMMARY OF THE INVENTION

In accordance with the above-described state of this art, it may be said that an object of the present invention is to provide a variable gain arrangement for equipment of the type described which affords improved accuracy.

According to a feature of this invention, the device having a gain variable as a function of range, operates by control of video-frequency radar signals.

According to another feature of this invention, the device having a gain variable as a function of range at a predetermined range interval for a coherent monopulse radar (comprising sum and difference channels), extractor circuits and quotient computer circuits receiving video signals from sum and difference channels, is characterized by the fact that it comprises two identical circuits having a gain varying, at least roughly, proportionally to the fourth power of the distance within said predetermined range interval, by the fact that each said circuit has n outputs corresponding to discrete gain values approximating said variation law and by the fact that said circuits are respectively connected between sum channel output and difference channel output, on the one hand, and extractor circuits, on the other hand.

Other features of this invention will appear more clearly from the following description of embodiments, the said description being made in conjunction with the accompanying drawings.

BRIEF DESCRIPTION OF THE DRAWINGS

FIG. 4 is the diagram of a second embodiment of the device according to the invention.

FIG. 5 is an operational curve for explaining the circuit shown in FIG. 4.

DESCRIPTION OF THE PREFERRED EMBODIMENT

Figure 1:
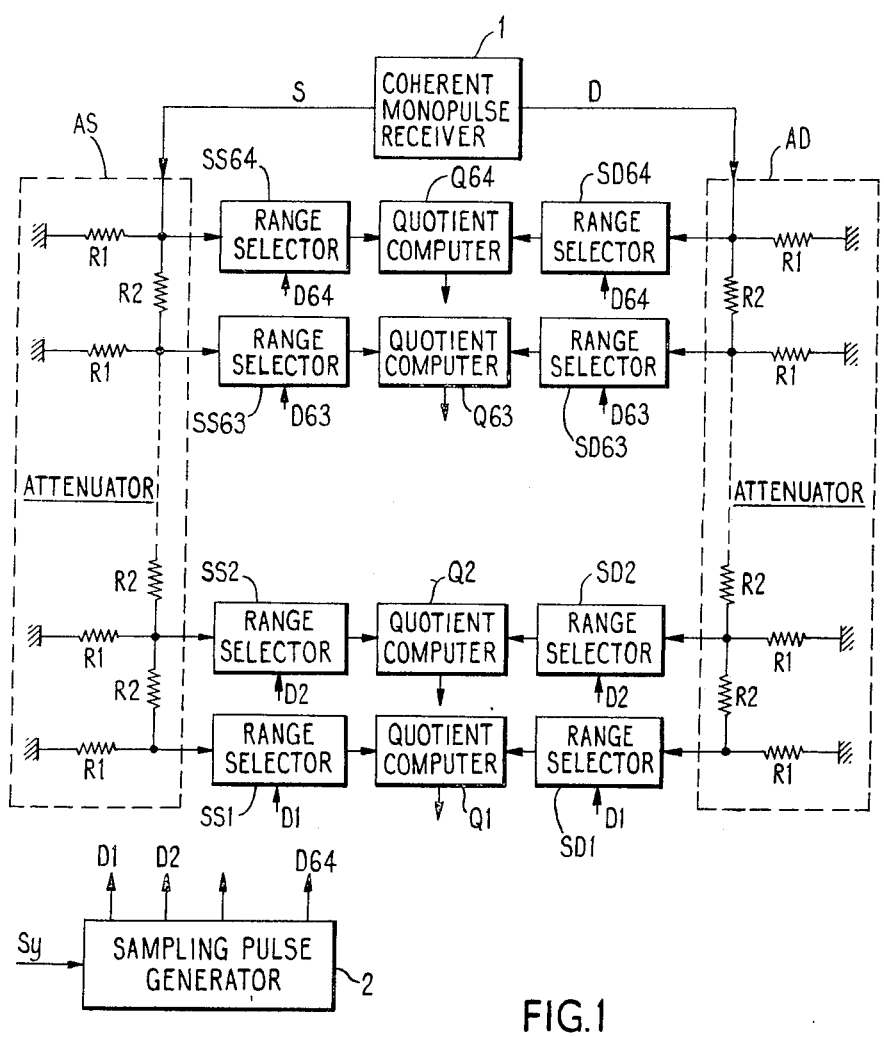
FIG. 1 is a block diagram of a first embodiment of the device according to the invention.

Referring now to FIG. 1, the block 1 represents conventional coherent receiver circuits in a monopulse radar. Those circuits are well known and, for example, are described in the above mentioned U.S. Pat. application. They comprise an antenna with two primary sources whose patterns are overlapping, a hybrid circuit delivering the sum and the difference of signals received by the two sources, and two identical channels for processing sum and difference signals. Each of said channels comprises a frequency converter stage connected to a common local oscillator, an IF amplifier and a phase discriminator receiving a reference wave from a coherent oscillator (that is an oscillator having a predetermined phase during each repetition period) which is maintained in a fixed relation with the phase of the transmitted pulse).

From phase discriminator outputs, video-frequency sum signal S and video-frequency difference signal D are produced. Those signals S and D are normally applied to extractor circuits, basically consisting of a sequence of range selectors, each selector consisting basically of a range gate and MTI filter. The so-called "range selectors" are known in the art by various names. Basically, they are devices for processing video within discrete relatively short range increments during each inter-pulse period of the radar. Such devices are referred to in Chapter 4 of the textbook "Introduction to Radar Systems" by Merrill I. Skolnik, a McGraw-Hill Book Company publication (1962), and illustrated at FIG. 4.41 (Page 152) of that text.

According to a first embodiment of the invention, signals S and D are respectively applied to two identical ladder attenuators AS and AD. In the described embodiment, assumption has been made that the area under surveillance has been divided into 64 adjacent range increments or "sections," target signals of targets located in those sections being selected by two sequences of 64 range selectors SS1 to SS64, for the sum signal, and SD1 to SD64, for the difference signal. Sequential switching-on of those selectors, for defining the said adjacent sections, is controlled by a generator 2, delivering adjacent sampling pulses D1 to D64 and synchronized by transmitted radar pulses sy, generator 2 delivering pulse D1 at a predetermined time after the transmitted radar pulse to define the beginning of the surveillance area.

Each of the attenuators AS and AD comprises 63 identical stages each stage providing the same unit attenuation. Range selectors SS1 to SS63 are respectively connected to the 63 attenuator stage outputs, selector SS1 being connected to the last attenuator stage output and selector SS64 at the input of the first one. Thus, the selector SS64 receives unattenuated video; provision of an extra stage at the beginning of the attenuator ladder being of no advantage. Connections between selectors (SD1 to SD64) and attenuator AD are identical. Output signals from pairs (a pair constituting one selector from the sum side and one from the difference side) of selectors SS1 – SD1 to SS64 – SD64 are respectively applied to 64 quotient computers (Q1 to Q64) which deliver the value of the angular deviation from antenna axis for targets detected in corresponding sections.

Operation of the above-mentioned circuits is as follows, reference being also made to FIGS. 2 and 3.

It is known that, in a radar, the signal received from a target, other things being equal, has an amplitude proportional to the inverse of the fourth power of the distance from radar to target, i.e., proportional to $(1/t^4)$, $t$ representing elapsed time. For compensating such a propagation attenuation, it is necessary to amplify the received signal proportionally to $t^4$, such an amplification function applying at least for a time period in each radar repetition period which corresponds to echo reception from the aforementioned surveillance area.

Figure 2:
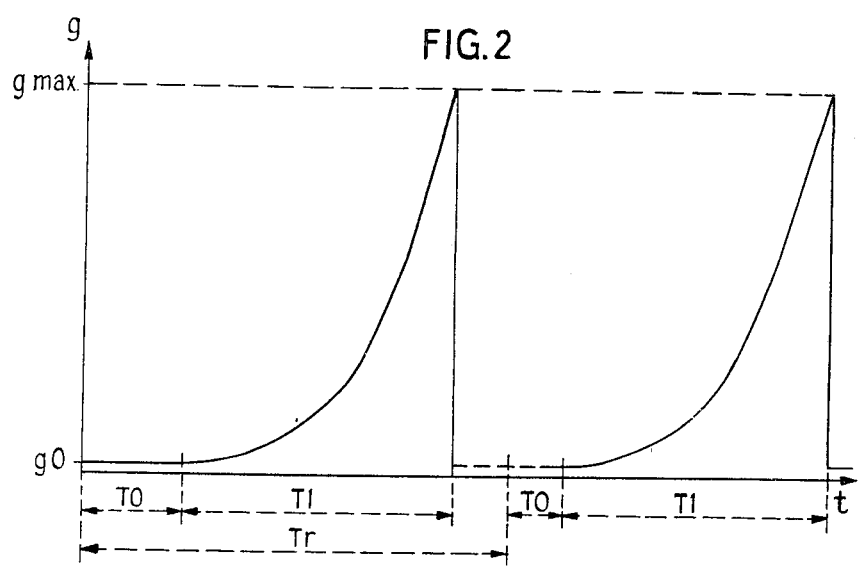
FIGS. 2 and 3 show curves for explanation purposes.
Figure 3:
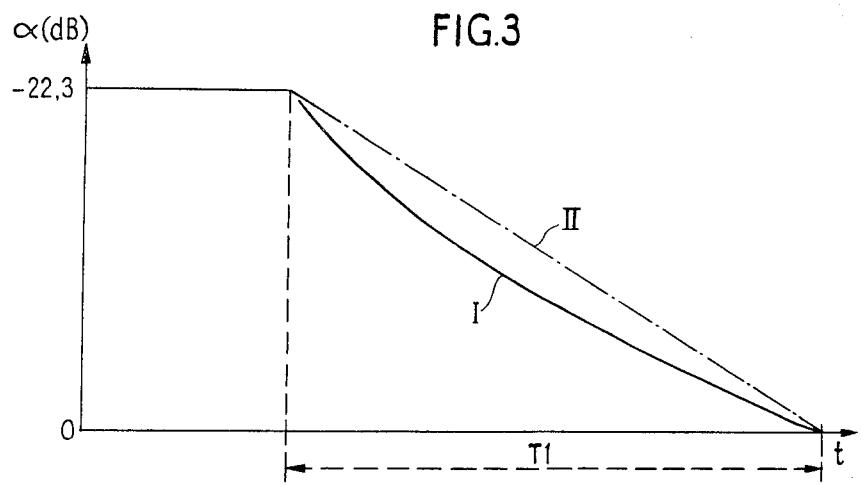

FIG. 2 shows the theoretical variation of gain $g$ in sum and difference channels that it is necessary to closely approximate during the time period T1 corresponding to the area to be examined (surveillance area). The period T1 occurs at time T0 after the transmission of each radar pulse (said pulses having a repetition period Tr). During period T1, gain varies from $g0$ to $gmax$. Beyond period T1, gain may remain constant, for example, equal to $g0$. It will be realized that the result is the same, either in amplifying signals S and D proportionally to $t^4$, or in attenuating them proportionally to $(1/t^4)$.

It is normally not necessary to follow the signal variation-versus-time law in a very precise manner, but especially in a monopulse radar, it is very important to maintain the gain (or attenuation) functions for sum signals S and difference signals D very nearly identical. Any differential variation from one channel to the other results in an error in the quotient D/S, and accordingly produces an error in target angular deviation value as determined by the radar.

In the embodiment shown in FIG. 1, signals S and D are attenuated, each attenuation stage providing the same unit attenuation. In other words, the variation law for attenuation $\alpha$ (t) as represented by curve I of FIG. 3 ($\alpha$ being measured in dB) is approximated by the straight line II, this straight line being in turn approximated by a staircase curve, each step corresponding to the attenuation at a corresponding output of an attenuator stage (AS or AD). The curve including 64 steps has not been shown in FIG. 3 for the sake of clarity. In that instance each stage then has an attenuation, measured in dB, equal to A/63, if A is the total attenuation which is to exist between signals from section 64 (not attenuated) and from section 1.

It appears that it is possible to obtain identity of attenuators AS and AD, and thus of sum and difference channel attenuations, with sufficient accuracy, it being only necessary to select parallel resistor R1 and series resistor R2 in each stage with sufficient precision.

In the particular embodiment first described, a range area 64 sections or range increments long has been assumed. Each of these range increments is approximately 50 meters long. The surveillance area is typically from 1225 meters minimum range out to 4425 meters. Total attenuation A between the sixty-fourth increment to the first one is of the order of 22.3 dB and each attenuator stage provides an attenuation of 22.3/63, i.e., about 0.35 dB.

It will be noted that errors caused by resistor tolerances are additive in the attenuator ladder and that, for sufficient accuracy in the nearest sections, it is necessary to use close tolerance elements.

A second embodiment shown in FIG. 4 overcomes that high accuracy resistor requirement and can therefore be more economically instrumented. FIG. 4 shows only that part of the device according to the invention which relates to the sum channel, the other part relating to the difference channel being obviously identical and understood in relation to the system from the foregoing.

In the second embodiment, a signal amplitude variation law is produced in two steps. Indeed, the device according to the invention comprises, on the one hand, identical serially mounted amplifiers 11, 12, 13, 14 and, on the other hand, identical ladder attenuators AS1, AS2, AS3, AS4 respectively connected to said amplifier outputs. For reducing the number of stages in each attenuator, the range selectors SS1 to SS64 have been grouped by four and correspondingly connected to each attenuator output which reduces the output number for each attenuator down to four. As it will be hereafter described, this results in enlarging the stairs of the staircase curve approximating the above mentioned straight line, and in reducing the number of the steps. Although a less accurate approximation of the law in $t^4$ is thereby obtained, as has been hereabove mentioned, this is not of the same concern as equality of gain between S and D channels. For clarification purpose, only selectors SS61 to SS64 have been shown. Of course, it is not technically necessary to reduce the number of steps in approximating the fourth power curve in the embodiment of FIG. 4, that being done essentially for economy.

Operation is as follows, reference being also made to FIG. 5 which shows the variation of the device gain g as a function of time. The curve I' shows the theoretical desired variation of g measured in dB, and the straight line II' shows the approximation linear law, it being assumed that signals applied to input of amplifier 11 have been amplified by $g0$. It appears that the gains of amplifiers 11, 12, 13, 14, which are all equal to $g1-g0$, make it possible to be at positions of points 11, 12, 13, 14 on the straight line II', respectively. Then, attenuators AS1, AS2, AS3, AS4 permit determination of the steps approximating the linear law down from those points in the direction of the straight line II'.

For example, the four outputs of attenuator AS1 feeding selectors SS16 – SS13, SS12 – SS9, SS8 – SS5 and SS4 – SS1 have gains respectively represented by the four steps under $g1$ considered in decreasing order. Ordinate distance between two successive steps corresponds to unit attenuator stage attenuation, i.e., to 22.3/16 or about 1.39 DB.

Due to the double operation described above, maximum possible error in a channel is equal to the sum of the error caused by the amplifier chain and of the error caused by attenuator AS4 which includes a substantially reduced number of stages. Thus it is possible to use elements having lower accuracy, while achieving very good accuracy with respect to gain identity between the sum and difference channels.

In the present description, consideration has been more particularly given to the case (FIG. 1) where 64 output attenuators are used. But, obviously, as hereabove mentioned, 63 identical amplifiers serially mounted instead of the 63 attenuator stages could be used, the order of the outputs being then reversed. In the present age of semi-conductor integrated circuitry, the use of such a large number of amplifiers is not significantly disadvantageous.

While the theoretical attenuation or amplification curve may be approximated by a straight line which permits a particularly suitable design for attenuators, such an approximation might be made in any other mathematical manner, the attenuator design being adapted accordingly.

It will be realized that the general term "gain" includes amplification and attenuation as used herein. In that context, attenuation is fractional gain or gain less than unity. Accordingly, a device such as an attenuator will be thought of as having fractional gain.

While the principles of this invention have been hereabove described in relation with specific embodiments, it will be clearly understood that said description has only been made by way of example and is not intended to limit the scope of this invention.

What is claimed is:

1. In a pulsed radar system including a radar transmitter and receiver, and a plurality of range selectors operated synchronously with the transmitted pulse of said system to sample the received video in a plurality of range increments comprising a predetermined portion of the interpulse period, a sensitivity-time control device comprising:

a multi-stage ladder attenuator means having an input connected to receive video signals from said receiver, said ladder attenuator means having a plurality of taps providing increasing attenuation progressing along the stages thereof from said input;

and connection means for connecting the inputs of said range selectors from said taps, in groups of at least one range selector per tap, and in an order such that the signal supplied to range selectors corresponding to the nearest ranges is supplied with the lowest effective gain and range selectors corresponding to farthest ranges is supplied with the greatest effective gain from the video output of said receiver.

2. Apparatus according to claim 1 in which said ladder attenuator means is divided into a plurality of subgroups of said stages and a plurality of serially connected amplifier stages are provided and connected thereto, the input of the first of said amplifiers being connected to said receiver video signals, the output of the last of said serially connected amplifiers providing the input for the one of said attenuator sub-groups corresponding to range selectors sampling the latest received signals within said interpulse period, the inputs of the remaining sub-groups of said attenuator being connected to the interconnections of said serial amplifiers whereby the earliest received signals within said interpulse period are provided to the ones of said range selectors with the lowest effective gain from the video output of said receiver.

3. Apparatus according to claim 2 in which said attenuator means comprises only substantially nonreactive elements.

4. Apparatus according to claim 1 in which said attenuator means comprises only substantially nonreactive elements.

5. In a monopulse radar system having sum and difference receiving channels and which includes a plurality of range selectors operated synchronously with the transmitted pulse of said system to sample the received video in a plurality of range increments within a predetermined portion of the receiving period between successive transmitted pulses, a device for providing accurate equalization of signal amplitudes from said receiving channels as a function of echo range delay over said predetermined portion of the receiving period, the combination comprising:

a pair of ladder attenuators connected to receive video signals, each from a corresponding one of said receiving channels, said ladder attenuators each having a plurality of taps providing increasing attenuation therealong from the input thereof;

and connection means for each of said attenuators for supplying input video signals to corresponding range selectors, said means operating in each channel to connect the input of the range selector corresponding to the nearest in range of said range increments to the attenuator tap providing the greatest attenuation, the other inputs of said range selectors being connected to said taps in groups of at least one range selector input per attenuator tap, so as to provide for decreasing attenuation for said selectors according to increasing range of the corresponding range increments.

6. Apparatus according to claim 5 in which said attenuators have n stages, said taps are between said stages, and each of said stages provides an attenuation substantially equal to $A/n$, where A is the attenuation in decibels necessary over said predetermined portion of said interpulse period to provide an approximation of a fourth power signal-versus-range attenuation function in each of said sum and difference channels.

7. Apparatus according to claim 6 in which said attenuator means comprises only substantially nonreactive elements.

* * * * *